R. M. THOMPSON.
COURSE AND SPEED INDICATING DEVICE FOR FLYING MACHINES.
APPLICATION FILED JUNE 30, 1910.

1,121,309.

Patented Dec. 15, 1914.

WITNESSES:
M. F. McNeil
Fred Hall

INVENTOR
Robert M. Thompson
BY
P. L. Elliott
ATTORNEY

UNITED STATES PATENT OFFICE.

ROBERT M. THOMPSON, OF TACOMA, WASHINGTON.

COURSE AND SPEED INDICATING DEVICE FOR FLYING-MACHINES.

1,121,309.  Specification of Letters Patent.  Patented Dec. 15, 1914.

Application filed June 30, 1910. Serial No. 569,626.

*To all whom it may concern:*

Be it known that I, ROBERT M. THOMPSON, a citizen of the United States of America, residing at Tacoma, in the county of Pierce and State of Washington, have invented certain new and useful Improvements in Course and Speed Indicating Devices for Flying-Machines, of which the following is a specification, reference being had therein to the accompanying drawing.

This invention relates to appliances for flying machines and other aerial craft, and has for its objects to provide a device whereby the vertical position, the height, the direction of travel, actual speed of travel, and the side drift, may be easily and quickly ascertained. I attain these and other objects by the devices, mechanisms and arrangements illustrated in the accompanying drawings, in which—

Figure 1:
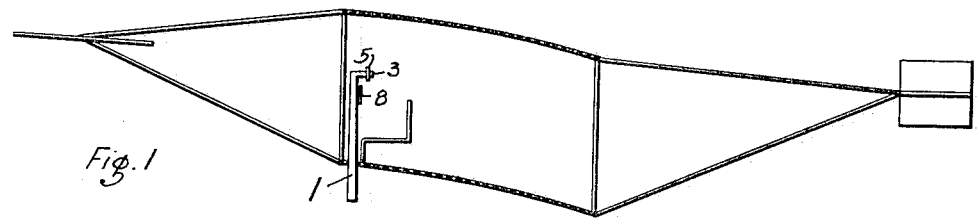
Figures 2, 3:
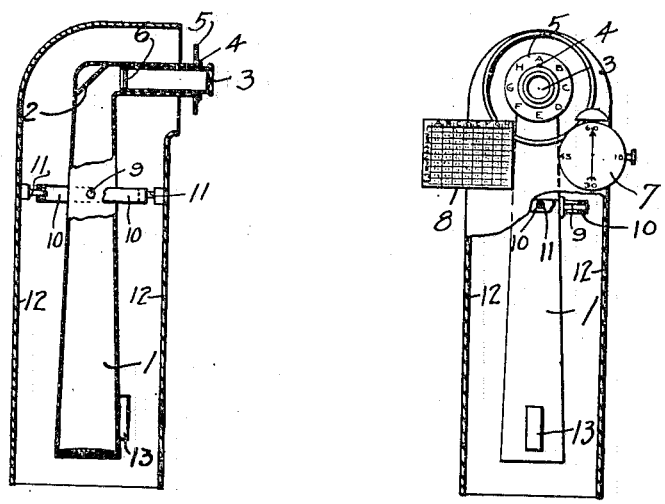
Figure 4:
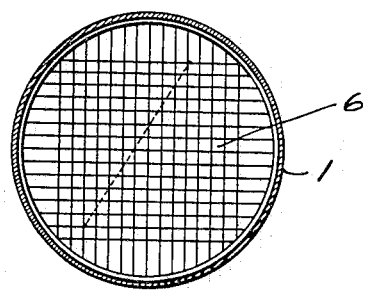

Figure 1 is a section of an aeroplane, showing my device mounted thereon; Fig. 2 is a vertical section of the device; Fig. 3 is an elevation thereof; and Fig. 4 is a view of the course of an object across the field of vision thereof.

Similar numerals of reference refer to similar parts throughout the several views.

In all aerial craft it is impossible to tell the actual speed of travel at any moment when flying at a considerable height above the earth, since the speed and direction of motion through the air will be different from the actual speed unless the air is absolutely still. If a flying machine be driven with the wind, the speed of the wind has to be added to that of the machine through the air to get the actual speed of the machine, and conversely, if the machine be driven against the wind, the one speed must be deducted from the other to ascertain the actual speed of the machine, and if the machine be going through a transverse current of the air it is drawn to one side by the current without any apparent effect on the machine, and in long flights this side drift may amount to a considerable item and must be allowed for in piloting the machine. So long as the country is known to the pilot, and the weather is clear, this side drift does not materially interfere with the action of the pilot since he can view the objects which are land-marks for a considerable distance and can note the actual direction of travel, and roughly estimate the speed of travel; but, if the territory is unknown to him and especially if the weather is such that he cannot see a great distance in advance, it is evident that though he may steer by the points of the compass, the side drift may bring him far from his destination. Another difficulty is found when it is desired that the pilot know the precise moment when he is vertically over a particular object, since the vertical angle of flight varies from moment to moment. In order to overcome these difficulties, I have devised the following mechanism whereby the speed and drift can be ascertained at any moment with a considerable degree of accuracy, the only essential being that some object immediately below the aerial craft shall be visible. This device consists of a telescope (or other suitable telemeter) having a main tube 1, bent at its upper end at right angles, and having a reflector 2 mounted in the angle thereof. An eye piece 3 is adjustably mounted in the horizontal end of the tube 1, the focus being adjusted by the rotation of the eye piece, so that the relative position of the pointer 4, mounted on the eye piece, will vary with the height at which the aeroplane is flying when the objects on the ground are in good focus. A disk 5 is secured to the tube 1 adjacent to the pointer 4 and has suitable markings thereon. A screen or grid 6 is mounted within the tube and has a series of spaced lines arranged at right angles to each other to form squares or rectangles. The tube 1 is secured to the aeroplane in such manner that the end always points directly downward, and so that the eye piece is conveniently located to the pilot. The field of view, as seen through the eye piece will be intersected by the lines of the screen, one set of said lines being parallel with the longitudinal axis of the craft, while the other set is at right angles thereto. Now, on looking through the eye piece, the pilot will see some object on the ground directly below him and can quickly bring the eyepiece to focus. He then notes the position of an object in the field of vision relatively to the lines of the screen and follows its course across the screen, and can tell by its course the actual direction in which he himself is traveling. In a convenient position is mounted a suitable stop watch 7 which may be provided with a repeating bell adapted to strike at equal intervals. By noting the number of squares through which the object passes during one or more of these time intervals, and by referring to the table 8 which shows the height of the machine from the ground and the space value of each of the squares, a fairly accurate estimate of the speed of travel and of the drift can be quickly ascertained. In order to facilitate this calculation, however, I mount in a suitable position, a table of figures 8, having columns corresponding with the position of the pointer 4 on the disk 5, and rows of figures across the columns each figure being the lineal value of one section of the squares of the screen or of multiples thereof at the distances at which an object would be in focus, so that if each division represents 100 feet measured on the ground, and the observation has been that 10 squares have been passed over in 15 seconds, it is evident that the machine is traveling straight ahead at the rate of about 4000 feet per minute, and if at the same time the same object has moved sidewise a distance of one square the machine has also drifted through a distance of 100 feet to one side while traveling forward 1000 feet, and the pilot on noting this fact can allow for it in steering so as to arrive at his destination. It is evident that this table of figures may be combined with the markings on the disk 5 so that the pointer 4 will indicate thereon the elevation as well as the longitudinal and transverse values of the grid spaces.

In order to be sure that the tube 1 always maintains a vertical position, it may be mounted on a pair of trunnions or pivots 9 secured to a ring 10, which is mounted on another pair of trunnions 11, whose axis is at right angles to the axis of the pivots 9, said pivots 11 being secured to the inner side of a suitable wind shield 12 suitably mounted on the flying machine and adapted to protect the tube from the effects of the wind of motion of the machine. A weight 13 may be secured to the lower end of the tube 1 to counterbalance the weight of the horizontal portion thereof.

This device may also be used as a range finder for aerial vessels whereby the precise moment at which a projectile is to be dropped therefrom may be ascertained. The height above the earth, the speed of forward travel and of drift, may be obtained as above described, and the horizontal distance of the object aimed at may be ascertained as soon as said object enters the field of vision of the apparatus, since the spaces between the cross lines indicate definite distances about the central point of the field of vision. By means of suitable tables, it can be found that the projectile must be released when the object aimed at occupies a certain position in the field of vision and the operator will simply watch the object until it reaches the said position.

Having described my invention, what I claim is:

1. In a device of the class described, the combination with a moving aerial craft; of a range finder mounted thereon; a grid of spaced lines supported in the field of vision; and means controlled by said range finder and adapted to indicate the lineal value of the spaces of the grid at the objective point of the range finder.

2. In a device of the class described, the combination of a moving aerial craft; a hollow vertical shield mounted thereon; a universal support secured within said shield; a range finder mounted on said universal support and within said shield; a grid of spaced lines supported in the field of vision; and means controlled by said range finder and adapted to indicate the lineal value of the spaces of the grid at the objective point of the range finder.

3. In a device of the class described, the combination of a moving aerial craft; of optical means mounted thereon, said means having an adjustable focusing eyepiece adapted to bring the objects on the plane vertically below the craft into focus and to indicate the distance to the plane containing the objects; and a scale in the focal plane and divided into areas to enable the determination of the distance between two or more objects in the plane.

4. In a device of the class described, the combination of a moving aerial craft; of a telescope mounted thereon and pointing vertically downward therefrom; a grid divided into areas and supported within said telescope; a focusing eyepiece mounted on said telescope; a scale mounted on said telescope; and a pointer mounted on and moved by said focusing eyepiece and lying adjacent said scale and adapted to indicate thereon the lineal value of the sides of said areas in the grid at the distance at which the eyepiece is in focus.

5. In a device of the class described, the combination of a range finder; a grid of spaced lines supported in the field of vision; and means controlled by said range finder and adapted to indicate the lineal value of the spaces of the grid at the objective point of the range finder.

6. In a device of the class described, the combination with a telemeter; of an area scale in the focal plane of the telemeter, said scale dividing the focal plane into areas to enable the determination of the distance between two or more points distant from the telemeter.

7. In a device of the class described, the combination with a telemeter; of an area scale in the focal plane of said telemeter, said scale dividing the focal plane into equal areas to enable the determination of the distance between two or more points distant from the telemeter.

8. In a device of the class described, the combination with a telemeter; of an area scale in the focal plane of the telemeter, said scale dividing the focal plane into areas to enable the determination of the distance between two or more points observed simultaneously and lying in a plane at right angles with the line of sight and distant from the telemeter.

9. A speed indicator for airships comprising, in combination, optical means for producing a real image of some stationary object; means rendering such image visible; and spaced distance marks visible in superposed relation to the image.

10. A speed indicator for airships comprising, in combination, optical means for producing a real image of some stationary object; means for rendering such image visible; and parallel lines visible in superposed relation to the image.

11. A speed indicator for airships comprising, in combination a gimbal joint structure; optical means for producing a real image; means for rendering such image visible; and spaced distance marks visible in superposed relation to the image.

12. In a device of the class described, the combination of a moving aerial craft; a universal support mounted on said aerial craft; a range finder mounted on said universal support; means whereby said range finder will always sight vertically downward; a grid of spaced lines supported in the field of vision; and means controlled by said range finder and adapted to indicate the lineal value of the spaces of the grid at the objective point of the range finder.

In testimony whereof I affix my signature in presence of two witnesses.

ROBERT M. THOMPSON.

Witnesses:
CHAS. W. STEWART,
G. M. ELLIOTT.